Dec. 10, 1968     I. HENNIG     3,415,212
FLOATING DRYDOCK
Filed April 7, 1967     3 Sheets-Sheet 1
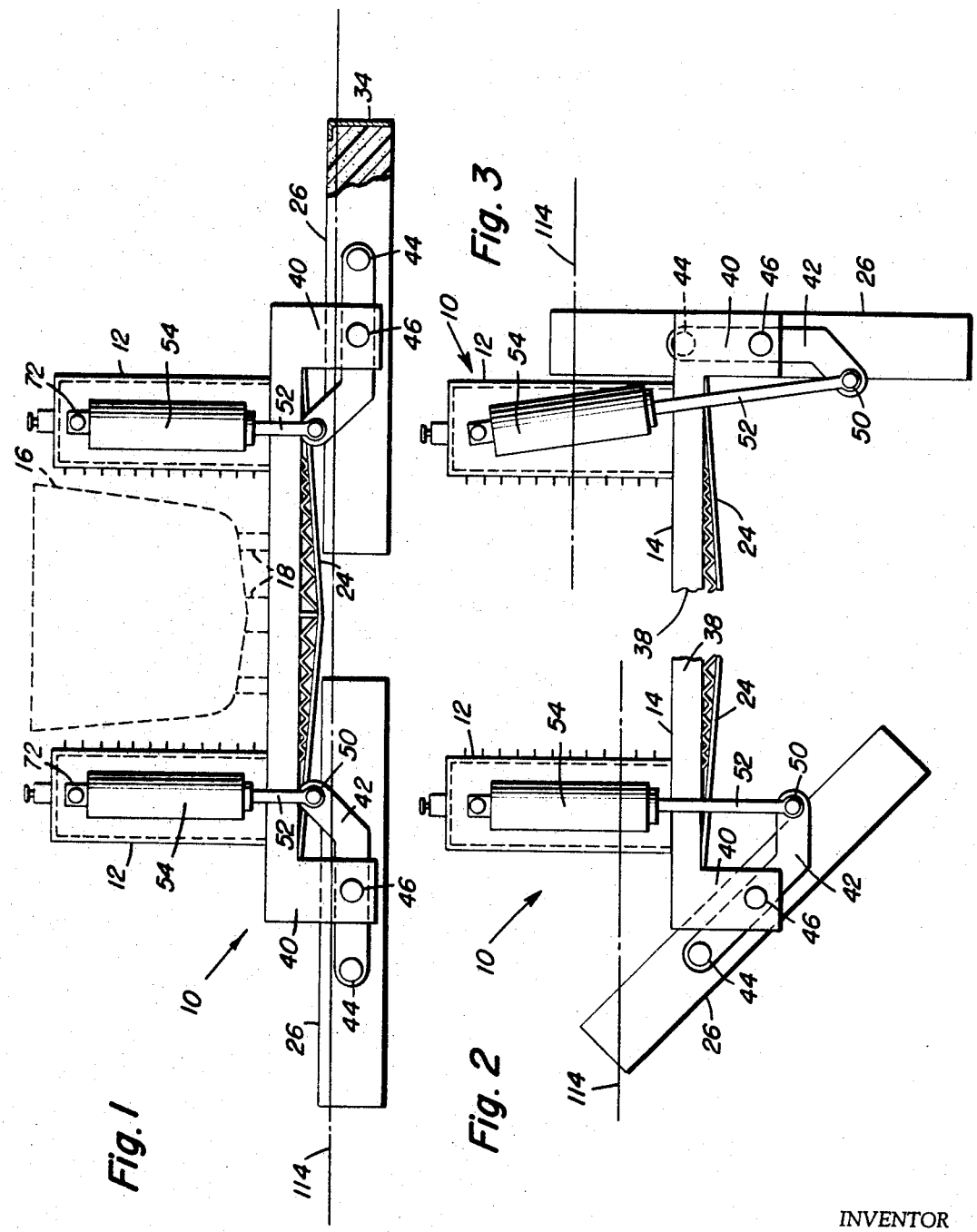
INVENTOR
*Irving Hennig*
BY
ATTORNEY

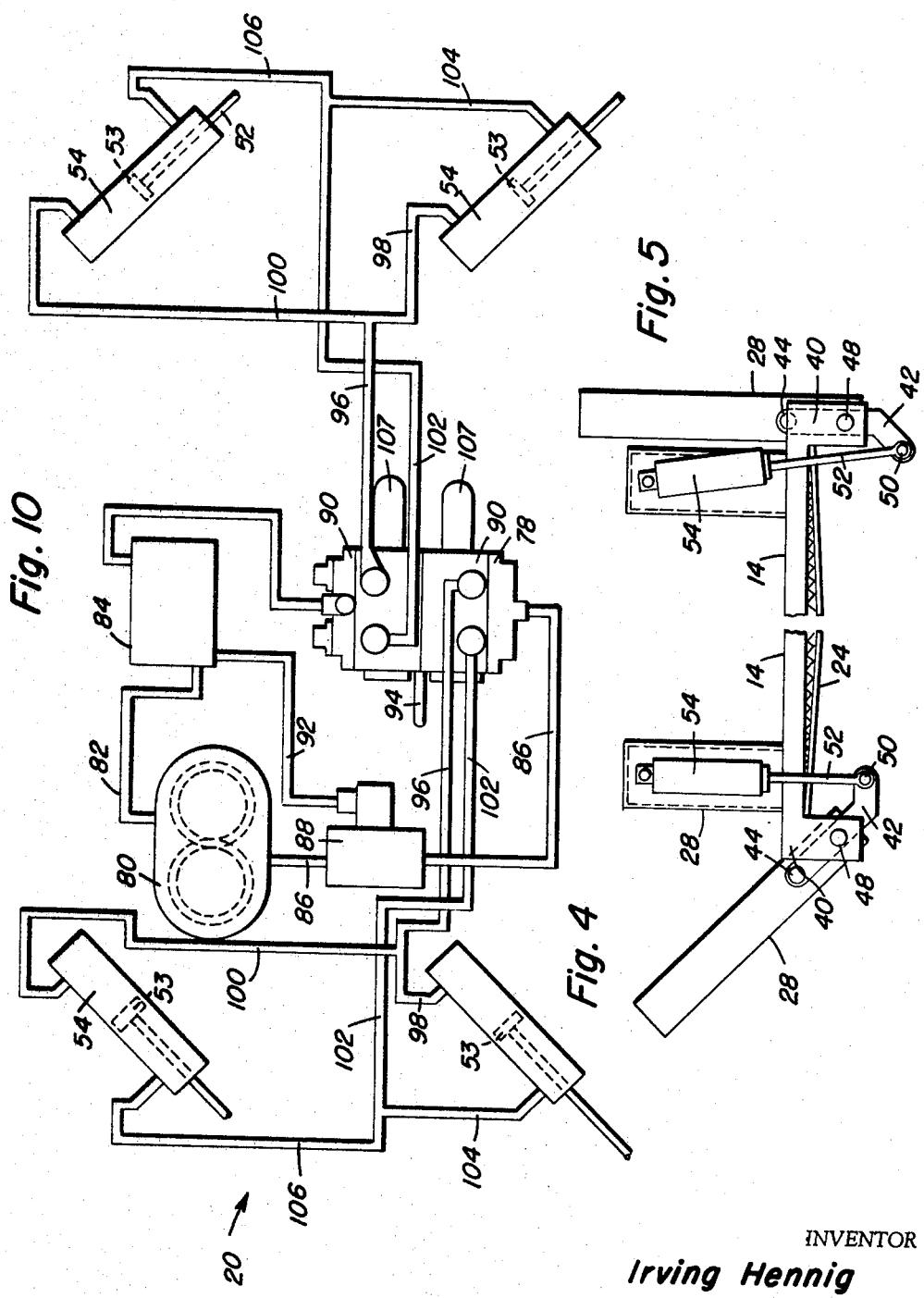

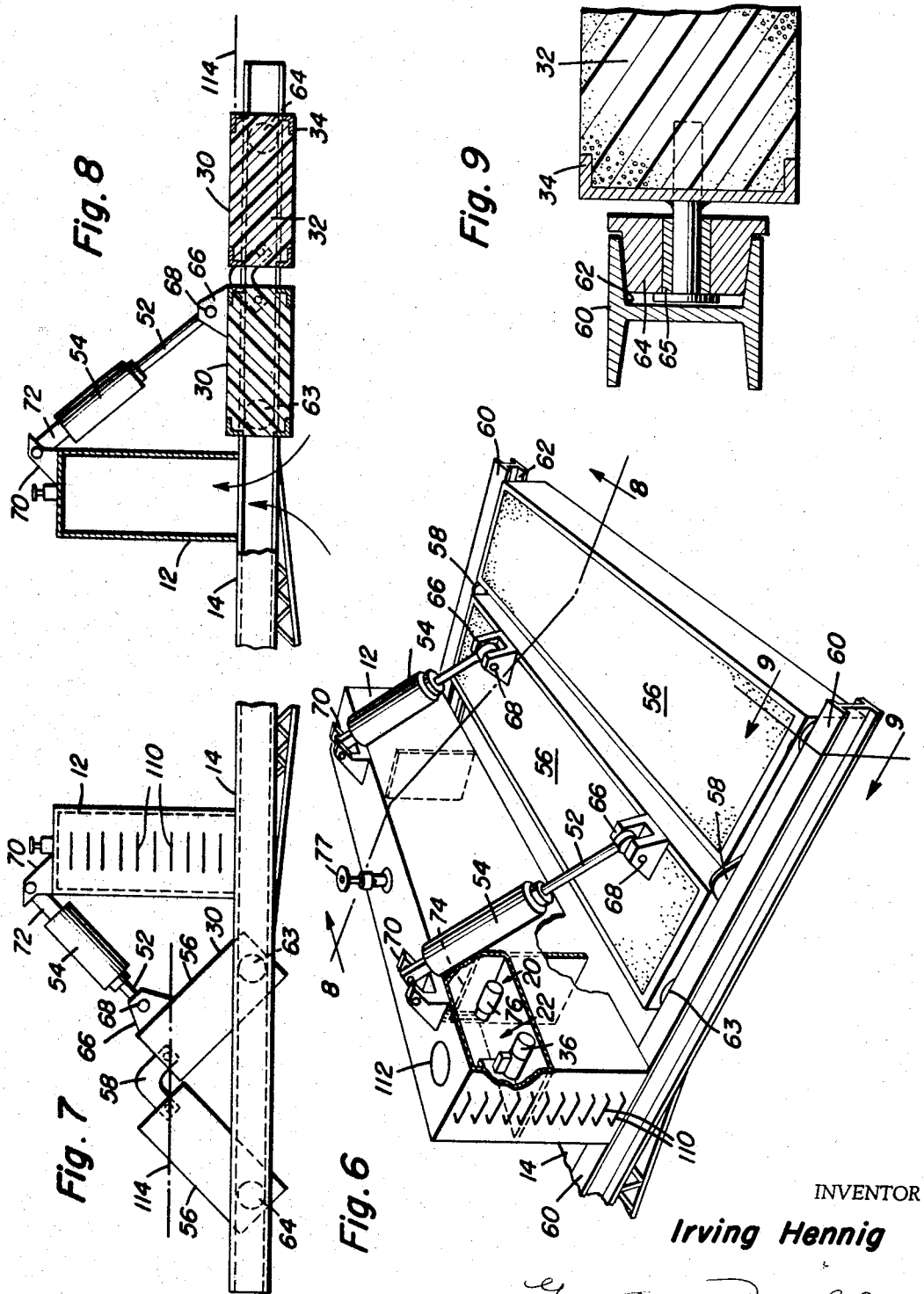

United States Patent Office 3,415,212
Patented Dec. 10, 1968

3,415,212
FLOATING DRYDOCK
Irving Hennig, 1332 Caillavet St.,
Biloxi, Miss. 39532
Filed Apr. 7, 1967, Ser. No. 629,318
9 Claims. (Cl. 114—45)

ABSTRACT OF THE DISCLOSURE

This invention is a floating drydock and consists of a floating drydock provided with two independent but complementary, buoyancy systems. One system of buoyancy consists of a pair of bottomless tanks, which may be controllably pneumatically pressurized or depressurized to range between maximum positive buoyancy and negative buoyancy, the tanks being supported in spaced apart relationship on a drydock floor, the floor between the tanks providing the support for the boat being drydocked.

The other buoyancy system is such that a minimum buoyancy sufficient to float the drydock under all conditions is always provided, and such buoyancy may be controllably increased. This second system is in the form of Styrofoam pontoons pivoted to the drydock floor, outside of the spaced apart tanks, and hydraulic piston and cylinder means for pivoting part or all of the foam pontoons up out of the water to decrease buoyance, and back into the water for increasing buoyancy.

Brief summary of invention

This invention is a floating drydock wherein the buoyancy of the drydock is controllable by two independent systems. One system consists of Styrofoam pontoon floats whose position is controllable to increase or decrease the buoyancy of the drydock. The other buoyancy system is also provided with bottomless tanks supporting a dock floor therebetween, wherein the bottomless tanks may be pressurized and depressurized to increase or decrease the buoyancy of the drydock. The Styrofoam pontoons at all times provide at least minimum buoyancy for floating the dry dock, and the position of the pontoons and pressurizable tanks are independently controllable to control the buoyancy of the dock to desired amount according to the size of the boat to be raised and supported above the water line.

The drydock consists of a pair of spaced apart bottomless tanks supported on the dock floor, a pressure supply means, such as a pump, for pressurizing the bottomless tanks, pressure escape valve means for each tank to depressurize the tank, and flat rectangular Styrofoam plastic pontoon floats pivotally secured to the dock floor on the side of the tanks that are away from each other. Hydraulic piston and cylinder means are connected between each tank and its adjacent float to pivot the pontoons between a horizontal position, providing maximum buoyancy, and an angular position providing lesser or minimum buoyancy. In one form, each float means is a single flat pontoon pivoted intermediate its ends to partly raise the float at an angle. In the other form, the float means is a pair of folding pontoons, hinged together at their contiguous edges for being lifted up above the horizontal position.

Objects of invention

This invention relates to a floating or pontoon drydock and has for an object to provide a floating drydock whose buoyance may be changed between a minimum, to support the drydock at a maximum depth and thus sink as deep as possible to receive a large boat, and then with suitable bilge and keel supporting blocks placed on the drydock floor in boat supporting position, raising the drydock by increasing its buoyancy as much as needed to the maximum buoyancy position to lift the boat entirely out of the water permitting access to the bottom of the boat, the term "boat," of course, including any floating ship, vessel of any size within the limits of the size of the drydock.

A further object of this invention is to provide floatation means for a drydock in two independent controllable structures, supplementing each other, one floatation system being pressurizable bottomless tanks whose buoyancy may be reduced to a completely non-buoyant condition, and the other floatation system being at least one pair of Styrofoam plastic rectangular pontoons and pivoting means for moving the pontoons between a position providing maximum buoyancy and a position providing minimum buoyancy sufficient to float the dock at all times, thus insuring that the dock cannot sink as it otherwise could were only the bottomless tank buoyancy means provided should a malfunction eliminate their buoyancy.

Brief description of figures

With the above and related objects in view, this invention consists in the details of construction and combination of parts, as will be more fully understood from the following description, when read in conjunction with the accompanying drawing, in which:

FIG. 1 is an end elevation of one form of floating or pontoon dock, with the pontoons in maximum buoyancy position.

FIG. 2 is an end elevation of the left half of FIG. 1, with the pontoons in an intermediate buoyancy position.

FIG. 3 is an end elevation of the right half of FIG. 1, with the pontoons in minimum buoyancy position.

FIG. 4 is a view similar to FIG. 2 of a slightly modified form.

FIG. 5 is a view similar to FIG. 3, of the form in FIG. 4.

FIG. 6 is a perspective view of the right half of another modified form, using a folding pontoon.

FIG. 7 is an end elevation of the left half of FIG. 6, the pontoon being folded to the minimum buoyancy position.

FIG. 8 is a side elevation, partly in section, on line 8—8 of FIG. 6.

FIG. 9 is an enlarged section on line 9—9 of FIG. 6.

FIG. 10 is a somewhat schematic view of the piston and cylinder control and operating means for pivoting the pontoons.

Detailed description

There is shown at 10 the floating drydock of this invention, including a pair of bottomless tanks 12 spaced apart on a drydock floor 14, the space between the tanks 12 being used for supporting a boat 16, of any suitable size, on keel and bilge blocks 18. These tanks 12, together with pneumatic pressurizing and depressurizing means diagrammatically shown at 20 in a control room 22 in each form of the invention serve as one buoyancy system for the drydock 10, and serve to vary the buoyancy from maximum positive, when the tanks are fully pressurized, to a negative buoyancy, when the tanks 12 are fully depressurized and thus full of water.

A second buoyancy system is provided by pontoons 26 in FIGS. 1, 2 and 3, 28 in FIGS. 4 and 5, or 30 in FIGS. 6 through 9, which are pivotally secured to the drydock floor 14 and manipulated between a maximum and minimum buoyancy position, the minimum buoyancy position being such that it will continue to maintain the dock afloat although partially submerged, irrespective of a maximum negative buoyancy of the tank system, particularly should there be a malfunction of the tank system. The pontoons are manipulated between their various positions by means of hydraulically actuated pistons 53, piston rods 52 and cylinders 54 pivoted to the tanks 12 and the pontoons and operated by controls 36 in the control room 22. The pressurizing and depressurizing means 20 for the tanks 12 are conventional, and are only shown diagrammatically, at best, while the hydraulic operating means for the cylinders and pistons are shown in FIG. 10. The pontoons are made of very buoyant foam pads 32, such as Styrofoam, rectangular in shape, and suitably rimmed with a steel frame 34. If desired, suitable reinforcing metal straps may be provided embedded in or over and under the pads 32.

In the forms shown in FIGS. 1 to 5 inclusive, the dock floor 14 is shown as reinforced by a bridge support or truss framework 24 thereunder and includes parallel end beams 38, so as to provide a strong floor capable of carrying the weight of the boat 16 on the keel and bilge blocks 18 therein. The floor beams 38 here terminate in downwardly extending fulcrum arms 40 at each end. Bell crank levers 42 are secured to the pontoon frames 34 of pontoons 26 and 28 by a lever end pin 44 and a lever intermediate pin 46 or 48, the intermediate pin 46 or 48 also serving as a pivot pin which also extends through the bottom end of the fulcrum arm 40. In FIGS. 1, 2 and 3, the pivot pin 46 is secured to the pontoon frame 34 at about the midpoint of its side edge, thus lifting about one half of pontoon 26 above the pivot pin when in minimum buoyancy position as in FIG. 3, but in FIGS. 4 and 5, the pivot pin 48 is secured to the frame 34 of pontoon 40 closely adjacent the end nearest the dock floor 14, thus lifting almost all of the pontoon 28 thereabove when in the minimum buoyancy position. Obviously, the amount of minimum buoyancy may be varied as the fixing of the position of the pivot pins on the pontoon frame 34 is varied.

The position of the pontoons is controlled by their pivot pin 50 connecting to the end of hydraulically operated piston rods 52 and piston 53 in the hydraulic cylinder 54. The operation of the piston rods 52 and pistons 53 and cylinder 54 is later described in connection with FIG. 10.

In FIGS. 6 to 9 inclusive, the pontoon 30 is shown in the form of two folding foam pad panels 56 pivoted together at their adjoining edges by hinges 58. Except for size, the pontoon panels 56 are the same as the pontoons 26 or 28. In this case, the dock floor beams are in the shape of H beams 60, extending a sufficient distance beyond the outer sides of the bottomless tanks 12. The extending H beams provide trackways 62 on their confronting sides for wheels 64 journaled at 65 on brass or bronze bearings on axles 67 secured to the sides of each panel 56 that is remote from their hinged edges. One panel 56 of each pair is pivoted to H beam 60 at 63. In order to fold the panels 56 of the pontoons 30 between their maximum buoyancy position in FIG. 5 to their minimum buoyancy position in FIG. 7, pivot receiving ears 66 are secured to the panel frames of pontoons 30 adjacent their hinged edges as for journaling the pivot pins 68 to the piston rods 52 of the hydraulic cylinders 54. The other ends of the cylinders for the folding pontoons 30 may have similar pivot receiving ears 70 on the top of the bottomless tanks 12 for pivot arm 72 on the top ends of cylinders 54.

The pneumatic pressurizing and depressurizing means 20 includes hoses 74 extending through floor 14 between each tank 12 and a reversible pressure and suction pump 76 in control room 22. Additionally, a manually operable pressure release valve 77 may be provided on the top of each tank 12. However, by using the reversible pressure and suction pump 76, the amount of air or water in each tank may be controlled directly from the control room 22.

Also located in the room 22 is hydraulic pressure pump and pump control means 78, which is shown in more detail in FIG. 10. This hydraulic pressure and control means 78 includes a hydraulic pressure pump 80 connected by line 82 to a reservoir 84 for a hydraulic fluid, such as oil. A line 86 leads from the pressure side of pump 80 through a pressure relief valve 88 to the control valves 90, one for each pair of cylinders 54. A pressure relief line 92 connects the relief valve 88 back to reservoir 84, the relief valve 88 operating when the piston 53 is at either extreme position within the cylinder 54, which is when the pontoons are at their extreme maximum or minimum bouyancy positions. Inasmuch as both pontoons should be moved simultaneously, a single pressure control level 94 operates both valves 90 simultaneously, and each is connected by lines 96 branched at 98 and 100 to one side of the piston rod 52 of piston 53 within the cylinders 54, and other lines 102, branched at 104 and 106 to the other sides of the same pistons thus positively moving the piston rods 52 in either direction. Should one pontoon get out of phase with the other, an individual control lever 107 is provided on each valve 90 so as to jockey valves 90 back into proper phase.

The control room 22 may be reached by ladder rungs 110 on the side of the tank and through an access manhole 112 on the top of the tank. Suitable forced ventilation will, of course, be provided for the room 22 as needed.

Operation of invention

The same pneumatic pressure means 20 and hydraulic pressure means 78 are used in all forms of the invention. When taking on a floating boat 16, the tanks 12 are emptied of air and filled with water, as much as necessary, the water level 114 changing to sink the float to the desired level, and this is further controlled by manipulating the pontoon as much as necessary toward the minimum buoyancy position. As pointed out, even in their minimum buoyancy position, the drydock 10 will remain afloat. The boat 16 is then floated to between the tanks 12 and the blocks 18 are then placed in position. The pontoons may then be manipulated toward or from their maximum buoyancy position, which position also provides maximum stability to the floating drydock. The pneumatic pressure and vacuum means 20 is then actuated to force air into the tanks 12 and force water out of the tanks 12, providing additional buoyancy to lift the dry dock 10 and the boat 16 thereon. If desired, the hand operated pneumatic pressure escape valves 77 may be opened while the pontoons are manipulated, letting water flow out of the bottom while the pontoons are doing some lifting, but when a position of stability is reached, the valves 77 must be closed and further lifting is provided by operating the pneumatic means 20 to force air into and water out of the bottomless tanks 12.

In the drawing, like numbers refer to like parts, and for the purposes of explication, set forth below are the numbered parts of the improved floating drydock:

10 floating drydock
12 bottomless tanks
14 dock floor
16 boat
18 keel and bilge blocks
20 pneumatic pressurizing and depressurizing means
22 control room
24 bridge support or truss frame
26 pontoons in FIGS. 1, 2 and 3
28 pontoons in FIGS. 4 and 5
30 pontoons in FIGS. 6 through 9
32 foam pads
34 pontoon frame
36 controls in room 22
38 floor beams
40 fulcrum arm on 38, FIGS. 1 through 5
42 bell crank lever
44 lever end securing pin
46 lever intermediate securing and pivot pin, FIGS. 1, 2 and 3
48 lever intermediate securing and pivot pin, FIGS. 4 and 5
50 pin pivoting lever 42 to piston rod 52
52 piston rod 53 piston
54 hydraulic cylinder
56 folding panels of pontoon 30 of FIGS. 6 through 9
58 hinges for panels 56
60 H beams
62 trackways on inner side of 60
63 pivot of 56 to 60
64 pontoon bearing wheels
65 wheel bearings
66 pivot pin receiving ears
67 axles
68 pivot pins through 66
70 pivot ears on tanks
72 pivots through ears 70
74 pneumatic hoses
76 reversible pneumatic pressure and suction pump
77 hand operated pressure escape valves
78 hydraulic pressure means
80 hydraulic pressure pump
82 line from 80 to 84
84 hydraulic reservoir
86 line from 80 through 88 to 90
88 pressure relief valve
90 pressure control valve
92 pressure relief line 88 to 84
94 single control lever for both pressure control valves
96 line from 90 to 98 and 100
98 line to one side of 53 in one 54 of each pair of 54
100 line to other side of 53 in same one 54 of same pair of 54
102 line from 90 to 104 and 108
104 line to one side of 53 in one 54 of same pair of 54
106 line to other side of 53 in same one 54 of other pair of 54
108 individual control handle for each valve 90
110 ladder rungs
112 access manhole
114 water levels Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A floating drydock (10) comprising a dry dock floor (14), a buoyancy system comprising a pair of spaced apart bottomless tanks (12) secured to said drydock floor (14), means (20) to controllably pneumatically pressurize and depressurize said tanks (12) to vary their buoyancy between positive and negative buoyancy, said drydock floor (14) being adapted to receive and drydock a boat (16) thereon on the inner side between said spaced apart tanks (12), and a second buoyancy system (26), means (FIG. 10) to control the buoyancy of said second buoyancy system between a maximum buoyancy (FIG. 1) and a minimum buoyancy (FIG. 3), the minimum buoyancy being sufficient to maintain said drydock afloat under all normal conditions including negative buoyancy of said first buoyancy system, said second buoyancy system comprising pontoons (26, 28 or 30) pivotally secured to said drydock floor (14), at least one pontoon on the outer side of each said spaced apart tank (12), means (40, 50, 52, 53 and 54) in said second buoyance control system (FIGURE 10) pivoting said pontoons between a horizontal position (FIGURE 1) providing maximum buoyancy and positions angular to the horizontal at least partially above said drydock floor (14) providing progressively less buoyancy.

2. The drydock of claim 1, said pontoon pivoting means (40, 50, 52, 53 and 54) including a pressure operated piston (53) and cylinder (54) means pivoted at one end (44) to one said pontoon (26) and at its other end to its said adjacent tank (12).

3. The drydock of claim 1, said drydock floor (14) having a pair of fulcrum arms (40) extending outside each said tank, each said pontoon (26) being pivotally mounted between each said pair of fulcrum arms, and a pivot connection (50) between each said pontoon and a piston rod (52) of its said hydraulic piston (53) and cylinder (54) means.

4. The drydock of claim 3, said pivot connection (50) being in a bell crank lever secured to said pontoon (26).

5. The drydock of claim 1, said drydock (10) having a pair of spaced apart channeled parallel trackways (62) extending horizontally beyond each said tank (12), each said pontoon (30) comprising a pair of pontoon panels (56) hingedly foldable (58) together along their contiguous edges.

6. The drydock of claim 5, one of said pontoon panels (56) adjacent its said tank being pivotally (63) secured to its said trackway (62), the other said pontoon panel having bearing members (64) guided along its said trackway, said pontoon pivoting means being pivotally connected between one of said pair of pontoon panels and its adjacent tank (12).

7. The drydock of claim 2, and pressure means (78) for actuating said hydraulic pressure piston (53) and cylinder (54) means comprising a hydraulic reservoir (84), a pressure providing pump (80) connecting said reservoir to a control valve means (90) and thence to each side of each said piston (53) means in each said cylinder means (54) and thence return to said reservoir.

8. The drydock of claim 2, said pneumatic pressure means for said tanks including a pneumatic pressure pump (76) in a control room (22) located in one of said tanks (12).

9. The drydock of claim 2, said pneumatic depressurizing means for said tank comprising pneumatic pressure escape means (76 or 77) connecting to the top of each said bottomless tank (12).

References Cited
UNITED STATES PATENTS

| | | | |
|---|---|---|---|
| 123,402 | 2/1872 | Janicki | 114—46 |
| 1,107,768 | 8/1914 | Donnelly | 114—45 |

ANDREW H. FARRELL, *Primary Examiner.*